(12) United States Patent
Sano et al.

(10) Patent No.: US 11,630,401 B2
(45) Date of Patent: Apr. 18, 2023

(54) LAMINATE AND CONDUCTIVE ROLLER

(71) Applicant: Archem Inc., Tokyo (JP)

(72) Inventors: Takehiro Sano, Yokohama (JP); Akihide Osaku, Kawasaki (JP); Manami Gake, Fujisawa (JP)

(73) Assignee: Archem Inc., Tokyo (JP)

( * ) Notice: Subject to any disclaimer, the term of this patent is extended or adjusted under 35 U.S.C. 154(b) by 681 days.

(21) Appl. No.: 16/487,616

(22) PCT Filed: Mar. 6, 2018

(86) PCT No.: PCT/JP2018/008647
§ 371 (c)(1),
(2) Date: Aug. 21, 2019

(87) PCT Pub. No.: WO2018/168584
PCT Pub. Date: Sep. 20, 2018

(65) Prior Publication Data
US 2020/0064754 A1    Feb. 27, 2020

(30) Foreign Application Priority Data
Mar. 17, 2017   (JP) .............................. JP2017-053359

(51) Int. Cl.
*G03G 15/08*   (2006.01)
*C08G 18/67*   (2006.01)
(Continued)

(52) U.S. Cl.
CPC ....... *G03G 15/0808* (2013.01); *C08G 18/672* (2013.01); *C08G 18/7614* (2013.01);
(Continued)

(58) Field of Classification Search
None
See application file for complete search history.

(56) References Cited

U.S. PATENT DOCUMENTS

2015/0212461 A1    7/2015  Abe et al.
2017/0136750 A1    5/2017  Osaku et al.
(Continued)

FOREIGN PATENT DOCUMENTS

CN        106457802 A      2/2017
EP          3412451 A1    12/2018
(Continued)

OTHER PUBLICATIONS

Machine translation of JP 2009-008894 A (Year: 2009).*
(Continued)

*Primary Examiner* — Ramsey Zacharia
(74) *Attorney, Agent, or Firm* — Kenja IP Law PC

(57) ABSTRACT

Providing a laminate having an excellent adhesiveness between a base layer and a surface layer while having a good flexibility. In order to solve the aforementioned problems, the laminate of the present disclosure comprises at least a base layer, an intermediate layer and a surface layer, wherein a base layer composition contains an urethane resin, an intermediate layer composition contains an energy ray curable resin having (meth)acryloyl group in a molecule thereof, and, a non-UV curable resin having only isocyanate group as reactive functional group, and a surface layer composition contains a UV curable resin having the (meth) acryloyl group in the molecule.

20 Claims, 2 Drawing Sheets

(51) Int. Cl.
　　　C08G 18/76　　(2006.01)
　　　C08J 7/04　　　(2020.01)
　　　C09D 175/04　　(2006.01)
　　　G03G 15/20　　(2006.01)
　　　B32B 27/30　　(2006.01)
　　　B32B 27/40　　(2006.01)
　　　G03G 15/02　　(2006.01)
　　　G03G 15/16　　(2006.01)

(52) U.S. Cl.
　　　CPC ............ *C08J 7/042* (2013.01); *C09D 175/04* (2013.01); *C08J 2375/14* (2013.01); *C08J 2475/04* (2013.01)

(56) References Cited

U.S. PATENT DOCUMENTS

| 2017/0355178 A1 | 12/2017 | Sano |
| 2018/0003218 A1 | 1/2018 | Sano |

FOREIGN PATENT DOCUMENTS

| JP | 2009008894 A | 1/2009 |
| JP | 2012159736 A | 8/2012 |
| JP | 2013241508 A | 12/2013 |
| JP | 2013249438 A | 12/2013 |
| JP | 2013253231 A | 12/2013 |
| JP | 2015158669 A | 9/2015 |
| JP | 2016010949 A | 1/2016 |
| JP | 2016141143 A | 8/2016 |
| JP | 2016141147 A | 8/2016 |
| WO | 2017135284 A1 | 8/2017 |

OTHER PUBLICATIONS

Machine translation of JP 2013-253231 A (Year: 2013).*

Jan. 25, 2021, search result of Office Action issued by the China National Intellectual Property Administration in the corresponding Chinese Patent Application No. 201880018850.0.

Jul. 23, 2020, search result of the Extended European Search Report issued by the European Patent Office in the corresponding European Patent Application No. 18768059.0.

Sep. 17, 2019, International Preliminary Reporton Patentability issued in the International Patent Application No. PCT/JP2018/008647.

May 15, 2018, International Search Report issued in the International Patent Application No. PCT/JP2018/008647.

* cited by examiner

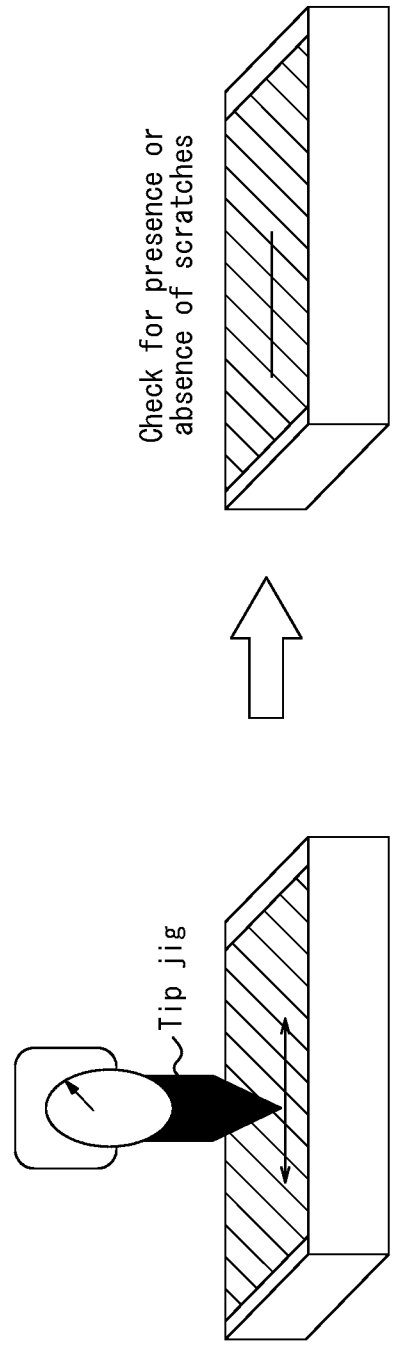

LAMINATE AND CONDUCTIVE ROLLER

TECHNICAL FIELD

The present disclosure relates to a laminate and a conductive roller.

BACKGROUND

Conventionally, in order to suppress toner filming, etc., a technique for disposing a UV curable resin on a base layer as a surface layer in a conductive roller having an elastic layer containing polyurethane is known. In the case of using a UV curable resin in the surface layer, there was a possibility that when curing via ultraviolet ray irradiation, cure shrinkage was likely to occur in the surface layer, leading to strain occurring between the base layer and the surface layer, and thus, the adhesiveness between the layers became poor.

Therefore, numerous techniques for improving the adhesiveness between a base layer and a surface layer have been developed. For example, JP2016-10949A (PTL 1) discloses the technology relating to a laminate comprising at least two or more of the energy ray curable resin layer formed by curing a resin composition with an energy ray, wherein the laminate has an energy ray curable resin layer (1) and an energy ray curable resin layer (2), a first resin composition used in the formation of the energy ray curable resin layer (1) is configured from the energy ray curable resin (A) having an ethylene oxide skeleton having two or more ethylene oxide repeating units. The technology of PTL 1 can obtain a laminate with increased adhesiveness between layers and having a superior flexibility.

CITATION LIST

Patent Literature

PTL 1: JP2016-10949A

SUMMARY

Technical Problem

However, with regards to the technology (laminate) disclosed in PTL 1, further improvement in adhesion between the base layer and the surface layer has been desired from the viewpoint of improving adhesion durability when put into practical use such as when used in a conductive roller and the like.

It would thus be helpful to provide a laminate having a good flexibility, while having an excellent adhesiveness between the base layer and the surface layer. Further, another object of the present disclosure is to provide a conductive roller excellent in flexibility and adhesion durability.

Solution to Problem

As a result of performing examinations in order to solve the aforementioned problem, we discovered a laminate comprising at least a base layer, an intermediate layer formed on the base layer, and a surface layer formed on the intermediate layer, wherein by constituting the base layer from a base layer composition containing an urethane resin, constituting the intermediate layer from an intermediate layer composition containing an energy ray curable resin having (meth)acryloyl group in a molecule thereof, and, a non-UV curable resin having only isocyanate group as reactive functional group, and constituting the surface layer from a surface layer composition containing the energy ray curable resin having the (meth)acryloyl group in a molecule thereof, the base layer and a part of the intermediate layer adhere to the surface layer and a part of the intermediate layer by independent chemical bonds and the adhesiveness between the energy ray curable resin of the intermediate layer and the isocyanate compound of the non-UV curable resin is improved by an anchor effect by recesses and protrusions constituted by the isocyanate compound of the non-UV curable resin of the intermediate layer, thus, the adhesiveness can be further improved compared to the conventional technique.

Namely, the laminate of the present disclosure is a laminate comprising at least a base layer, an intermediate layer formed on the base layer, and a surface layer formed on the intermediate layer, wherein the base layer is a polymer of a base layer composition containing the urethane resin, the intermediate layer is a polymer of an intermediate layer composition containing an energy ray curable resin having (meth)acryloyl group in a molecule thereof, and, a non-UV curable resin having only isocyanate group as reactive functional group, and the surface layer is a polymer of a surface layer composition containing an energy ray curable resin having the (meth)acryloyl group in a molecule thereof. By providing the aforementioned configuration, an excellent adhesiveness between the base layer and the surface layer can be realized while having a good flexibility.

Further, regarding the laminate of the present disclosure, the non-UV curable resin in the intermediate layer composition is preferably a moisture curable resin, and the moisture curable resin more preferably has aromatics in the molecule. The adhesiveness between the base layer and the surface layer can be further improved thereby.

Furthermore, regarding the laminate of the present disclosure, the content of the energy ray curable resin in the intermediate layer composition is preferably 1 to 200 parts by mass per 100 parts by mass of the non-UV curable resin. The adhesiveness between the base layer and the surface layer can be further improved thereby.

Further, regarding the laminate of the present disclosure, it is preferable that the energy ray curable resin in the intermediate layer composition is the same as the energy ray curable resin in the surface layer composition, or, has a part of the composition which is the same as the energy ray curable resin in the surface layer composition. The adhesiveness between the intermediate layer and the surface layer can be further improved thereby.

Furthermore, regarding the laminate of the present disclosure, the energy ray curable resin in the intermediate layer composition preferably has a urethane skeleton in the molecule, and the energy ray curable resin having the (meth)acryloyl group in the surface layer composition preferably is a urethane (meth)acrylate. The adhesiveness between the base layer and the surface layer can be further improved thereby.

A conductive roller of the present disclosure is obtained using the laminate of the aforementioned present disclosure.

By providing the aforementioned configuration, and excellent flexibility and adhesion durability can be realized.

Advantageous Effect

The present disclosure can provide a laminate having an excellent adhesiveness between the base layer and the surface layer while having a good flexibility. Further, the present disclosure can provide a conductive roller having an excellent flexibility and adhesion durability.

BRIEF DESCRIPTION OF THE DRAWINGS

In the accompanying drawings:

FIG. 3 is a diagram for describing methods for evaluating the adhesiveness in the example.

DETAILED DESCRIPTION

An embodiment of the present disclosure will be described below using the drawings in accordance with need.

Laminate

The laminate of the present disclosure comprises at least the base layer, the intermediate layer formed on the base layer, and the surface layer formed on the intermediate layer, and may further comprise other layers in accordance with need.

Figure 1:
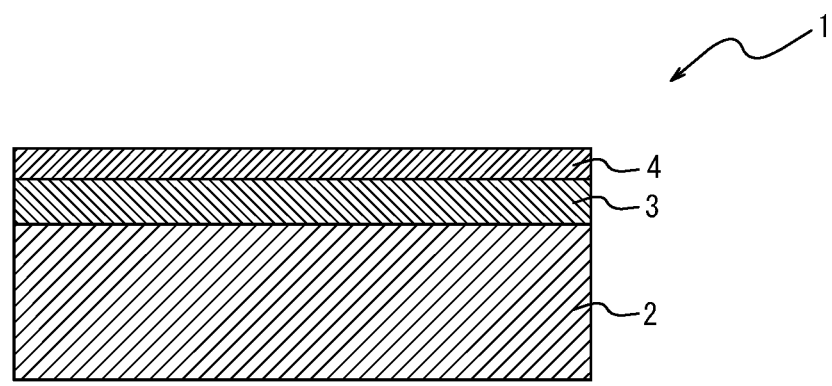
FIG. 1 is a cross-sectional diagram schematically illustrating an embodiment of a laminate.

FIG. 1 is a diagram schematically illustrating a cross-section of an embodiment of the laminate of the present disclosure, but the laminate 1 of the present disclosure in FIG. 1 comprises a base layer 2, an intermediate layer 3 formed on the base layer 2, and a surface layer 4 formed on the intermediate layer 3.

Base Layer

The base layer constituting the laminate of the present disclosure, as illustrated in FIG. 1, refers to a layer 2 positioned at the lowest part of the laminate 1, and is a polymer of the base layer composition containing the urethane resin.

The base layer composition is not specifically limited as long as it contains an urethane resin. By comprising an urethane resin in the base layer composition, a good flexibility can be realized in the base layer.

Here, the urethane resin is not specifically limited as long as there is a urethane bond in the molecule, and, for example, is a resin comprising a polymer compound (polyurethane) having a urethane bond —OCONH— in the molecule, and a urethane rubber, a urethane foam and the like may be provided. Thereamong, urethane foam is preferable from the viewpoint that a good flexibility can be realized.

Further, the urethane resin preferably has a hydroxyl group. By having a hydroxyl group, the isocyanate group in the non-UV curable resin in the intermediate layer composition which is described later forms a urethane bond, and as a result, the adhesiveness between the base layer and the intermediate layer can be further improved thereby. Note that, the form of the hydroxyl group in the urethane resin is not specifically limited. For example, it is considered that the hydroxyl group and the like exist in a free state in the molecule. Further, the urethane resin preferably has a (meth)acryloyl group. By having (meth)acryloyl group, when the surface layer which is described later is cured with an energy ray, not only the adhesiveness between the intermediate layer and the surface layer be further improved, but also the adhesiveness between the base layer and the intermediate layer. Note that, the form of the (meth)acryloyl group in the urethane resin is not specifically limited. For example, it is considered that the (meth)acryloyl group and the like exist in a free state in the molecule.

The additional components which may be included in the base layer composition are not specifically limited and may be appropriately selected depending on the purpose. For example, polyol, isocyanate, urethane bond forming catalysts, foam stabilizers, solvents, ion conductive agents, fillers, peptizers, plasticizers, softening agents, tackifiers, an antiblocking agent, separation agents, mold-releasing agents, bulking agents, colorants, cross-linking agents, vulcanizing agents, polymerization inhibitors, and the like may be provided. These additional components may be used singly or in combination.

The polyol is not specifically limited and may be appropriately selected depending on the purpose. Examples of polyols include polyether polyols, polyester polyols, polytetramethylene glycol, polybutadiene polyols, alkyleneoxide-modified polybutadiene polyols, polyisoprene polyols, and the like. These examples may be used singly or in combination.

Among these polyols, polyether polyols are preferred in terms of the flexibility and the low permanent compression set of the resin.

The isocyanate is not specifically limited and may be appropriately selected depending on the purpose. Examples of isocyanates include tolylene diisocyanate (TDI), prepolymerized tolylene diisocyanate (prepolymerized TDI), dephenylmethane diisocyanate (MDI), crude dephenylmethane diisocyanate (crude MDI), isophorone diisocyanate (IPDI), hydrogenated diphenylmethane diisocyanate, hydrogenated tolylene diisocyanate, hexamethylene diisocyanate (HDI), isocyanurate-modified products of these isocyanate compounds, carbodiimide-modified products of these isocyanate compounds, glycol-modified products of these isocyanate compounds, and the like. These examples may be used singly or in combination.

Among these isocyanates, prepolymerized tolylene diisocyanate (prepolymerized TDI) is preferable in terms of having a high urethane reaction activity, which easily improves the elasticity of the base layer and accordingly, the laminate.

The urethane bond forming catalysts are not specifically limited and may be appropriately selected depending on the purpose. Examples of urethane bond forming catalysts include dibutyltin dilaurate, dioctyltin acetate, dioctyltin bis(ethylmalate), dibutyltin bis(oleylmalate), dibutyltin diacetate, dibutyltin thiocarboxylate, dibutyltin dimalate, dioctyltin thiocarboxylate, tin octenoate, monobutyltin oxide, and the like. These examples may be used singly or in combination.

Among these urethane bond forming catalysts, dibutyltin dilaurate is preferable in that the catalytic activity is high.

The foam stabilizer is not specifically limited and may be appropriately selected in accordance with the purpose. Examples of foam stabilizers include silicone foam stabilizers, ionic surfactants, non-ionic surfactants, and the like. These examples may be used singly or in combination.

Among these foam stabilizers, silicone foam stabilizers are preferable in terms of having a good foam uniformity.

The solvent is not specifically limited and may be appropriately selected depending on the purpose. Examples of solvents include: alcohols such as methanol, ethanol, and isopropyl alcohol; butyl acetate; dimethyl sulfone; dimethyl sulfoxide; tetrahydrofuran; dioxane; toluene; xylene; and the like. These examples may be used singly or in combination.

Among these solvents, butyl acetate is preferable in terms of having a fast evaporation rate.

Intermediate Layer

The intermediate layer constituting the laminate of the present disclosure, as illustrated in FIG. 1, refers to a layer 3 formed on the base layer 2, and is a polymer of the intermediate layer composition containing the energy ray curable resin (hereinafter, simply referred to as the "the energy ray curable resin") having the (meth)acryloyl group in a molecule thereof, and, the non-UV curable resin (hereinafter, simply referred to as the "the non-UV curable resin") having only the isocyanate group as the reactive functional group.

As used herein, the phrase "the (meth)acryloyl group" means an acryloyl group and/or a methacryloyl group, and the phrase "(meth)acrylate" means acrylate or methacrylate.

The non-UV curable resin in the intermediate layer composition forms a strong bond with the urethane resin in the base layer composition due to the reaction with the hydroxyl group of the base layer and the intermolecular cohesive force, and on the one hand, the energy ray curable resin in the intermediate layer composition has a (meth)acryloyl group in the molecule, and thus, forms an acrylic bond with the (meth)acryloyl group in the resin contained in the surface layer composition which is described later. Further, when a (meth)acryloyl group is contained in the base layer, the base layer also forms an acrylic bond. As a result, the laminate of the present disclosure can realize an excellent adhesiveness between the base layer and the surface layer.

Furthermore, the reaction between the aforementioned base layer and the intermediate layer and the reaction between the surface layer and the intermediate layer are polymerization reactions by an energy ray such as UV rays and electron beams, and a polymerization reaction by an energy other than UV rays, and may be performed separately, thus, each component in the intermediate layer composition can be reacted with the components to be bonded in the base layer composition and the surface layer composition, and has an adhesiveness between the base layer and the surface layer superior to the case when performing a polymerization reaction with the three layers together. Furthermore, recesses and protrusions are formed by the isocyanate compound of the non-UV curable resin on the inside of the intermediate layer, thus, the adhesion between the energy ray curable resin of the intermediate layer and the isocyanate compound of the non-UV curable resin increases due to the anchor effect, and as a result, further improvements in the adhesiveness between the base layer and the intermediate layer can be anticipated compared to the conventional technique.

Energy Ray Curable Resin

The energy ray curable resin has a (meth)acryloyl group in the molecule. As stated above, an acrylic bond is formed with the (meth)acryloyl group in the resin containing the surface layer composition, and as a result, an excellent adhesiveness between the surface layers can be realized.

Note that, the energy ray curable resin is not specifically limited other than having (meth)acryloyl group in the molecule, and may contain other functional groups in accordance with the purpose. Examples of the energy ray curable resin include compounds having two (meth)acryloyl groups in the molecule, urethane (meth)acrylates having a urethane skeleton in the molecule, (meth)acrylates having an epoxy resin skeleton in the molecule, (meth)acrylates having a polyester skeleton in the molecule, (meth)acrylates having amino group in the molecule and the like. These examples may be used singly or in combination. Among these energy ray curable resins, using a compound having two (meth) acryloyl groups in the molecule is advantageous because bonds are formed in a three-dimensional manner in the intermediate layer, which further improves the elasticity of the layer and accordingly, the laminate, and specifically, further improves the adhesiveness of the intermediate layer to the surface layer and the base layer. Further, the energy ray curable resin preferably has a urethane skeleton in the molecule. Using the energy ray curable resin having a urethane skeleton such as urethane (meth)acrylate is advantageous because the elasticity of the resulting intermediate layer further improves.

Note that, the urethane (meth)acrylate is not specifically limited and may be appropriately selected depending on the purpose as long as the urethane (meth)acrylate has at least one (meth)acryloyl group ($CH_2$—CHCO— or $CH_2$=C($CH_3$)CO—) and at least one urethane bond (—NHCOO—) in the molecule. Examples of the urethane (meth)acrylate include polybutadiene-based urethane acrylates, carbonate-based urethane acrylates, ester-based urethane acrylates, ether-based urethane acrylates, and the like. These examples may be used singly or in combination.

Among these urethane (meth)acrylates, ether-based urethane acrylates obtained by the polymerization of polyether polyols and isophorone diisocyanate (IPDI) are preferred in terms of flexibility and a low permanent compression set, and specifically, an ether-based urethane acrylate having a molecular weight of 10,000 to 50,000 is preferable in the point that it has a low viscosity and the elasticity of the intermediate layer is easily improved.

Furthermore, it is preferable that the energy ray curable resin in the intermediate layer composition is the same as the energy ray curable resin in the surface layer composition which will be described later, or, has a part of the composition which is the same as the energy ray curable resin in the surface layer composition. The adhesiveness between the intermediate layer and the surface layer can be further improved thereby.

Note that, having a part of the composition which is the same means that the respective energy ray curable resins have the same structure, for example, it means that the main skeletons of the urethane (meth)acrylates together are ethers.

Note that, the UV curable resin, an electron beams curable resin, and a heat ray curable resin may be provided as the energy ray curable resin, but thereamong, the UV curable resin is preferable. This is because the reaction with the non-UV curable resin which is described later can be distinguished more reliably.

Further, the non-UV curable resin is a resin comprising an isocyanate compound having only isocyanate group as the reactive functional group in the molecule. As stated above, the isocyanate group forms a urethane bond with the hydroxyl group contained in the urethane resin contained in the base layer composition, and as a result, an excellent adhesiveness between the base layers can be realized. Note that, the isocyanate should be present in the non-UV curable resin, but it is preferable that the isocyanate is present on at least both ends of the non-UV curable resin from the viewpoint that the urethane bond can be made more efficiently.

Note that, the non-UV curable resin is not specifically limited as long as it is an isocyanate compound having only isocyanate group as the reactive functional group. For example, the isocyanate compound can be selected in accordance with need, and examples of the isocyanate compound include tolylene diisocyanate (TDI), prepolymerized tolylene diisocyanate (prepolymerized TDI), dephenylmethane diisocyanate (MDI), crude dephenylmethane diisocyanate (crude MDI), isophorone diisocyanate (IPDI), hydrogenated diphenylmethane diisocyanate, hydrogenated tolylene diisocyanate, hexamethylene diisocyanate (HDI), isocyanurate-modified products of these isocyanate compounds, carbodiimide-modified products of these isocyanate compounds, glycol-modified products of these isocyanate compounds, and the like. Further, the isocyanate compound may be a reaction product of the aforementioned isocyanates with the various polyols provided in the description (specifically, [0023]) of the base layer composition, and may be a compound in which the molar ratio of the isocyanate is greater than the molar ratio of the polyol, and a terminal functional group is isocyanate. Further, these isocyanates may be used singly or in combination.

Further, the non-UV curable resin is preferably a moisture-curable resin among those mentioned above. The energy ray curable resin in the intermediate layer composition can be reliably made by different independent polymerization reactions, and increases the bonding strength with the urethane resin contained in the base layer composition, thus, an excellent adhesiveness between the base layers can be realized. In addition, the polymerization reaction with moisture can suppress the deterioration of the base layer and the intermediate layer compared to the case when heat or an energy ray was used. Here, the moisture curable resin may be a reaction product of the aforementioned isocyanates with the various polyols provided in the description (specifically, [0023]) of the base layer composition, and may be a compound in which the molar ratio of the isocyanate is greater than the molar ratio of the polyol, and the terminal functional group is isocyanate.

Furthermore, the non-UV curable resin, among the moisture-curable resins described above, preferably has aromatics in the molecule. An excellent adhesiveness between the base layers can be realized thereby.

Further, the contents of the energy ray curable resin and the non-UV curable resin in the intermediate layer composition are not specifically limited, and can be appropriately changed in accordance with the purpose. However, from the point that the adhesiveness between the base layer and the surface layer can be increased in a well-balanced manner, the content of the energy ray curable resin in the intermediate layer composition is preferably 1 to 200 parts by mass per 100 parts by mass of the non-UV curable resin, and more preferably 5 to 100 parts by mass.

Note that, the intermediate layer composition may contain components other than the aforementioned energy ray curable resin and the non-UV curable resin if necessary. The additional components are not specifically limited and may be appropriately selected depending on the purpose. Examples of the additional components include a photopolymerization initiator, a photopolymerization promoter, a fine particle, an ion conductive agent, a filler, peptizers, a foaming agent, a plasticizer, a softening agent, a tackifier, an antiblocking agent, a separation agents, a mold-releasing agent, a bulking agent, a colorant, a cross-linking agent, a vulcanizing agent, a polymerization inhibitor, and the like. These additional components may be used singly or in combination.

Surface Layer

The surface layer constituting the laminate of the present disclosure is, as illustrated in FIG. 1, a layer 4 formed on the intermediate layer 3, and is a polymer of the surface layer composition containing the energy ray curable resin having the (meth)acryloyl group (hereinafter simply referred to as the "energy ray curable resin") in a molecule thereof.

The surface layer composition is not specifically limited as long as it contains the energy ray curable resin having the (meth)acryloyl group in a molecule thereof. As stated above, the energy ray curable resin in the surface layer composition has the (meth)acryloyl group in the molecule in the same manner as the energy ray curable resin in the intermediate layer composition, thus, an acrylic bond forms between the surface layer and the intermediate layer during polymerization. As a result, the laminate of the present disclosure can realize an excellent adhesiveness between the base layer and the surface layer.

Note that, the energy ray curable resin is not specifically limited as long as there is a (meth)acryloyl group in the molecule, and can contain other functional groups in accordance with the purpose. Examples of the energy ray curable resin include a compound having two (meth)acryloyl groups in the molecule, a urethane (meth)acrylate having a urethane skeleton in the molecule, a (meth)acrylate having an epoxy resin skeleton in the molecule, a (meth)acrylate having a polyester skeleton in the molecule, a (meth)acrylate having an amino group in the molecule and the like. These examples may be used singly or in combination. Among these energy ray curable resins, using a compound having two (meth)acryloyl groups in the molecule is advantageous because bonds are formed in a three-dimensional manner in the surface layer, which further improves the elasticity of the surface layer and accordingly, the laminate improves, and further improves the further improves the adhesiveness of the intermediate layer. Further, the energy ray curable resin preferably has a urethane skeleton in the molecule. Using the energy ray curable resin having a urethane skeleton such as a urethane (meth)acrylate is advantageous in terms that the elasticity of the resulting intermediate layer further improves.

Note that, as stated above, it is preferable that the energy ray curable resin in the intermediate layer composition is the same as the energy ray curable resin in the surface layer composition, or, has a part of the composition which is the same as the energy ray curable resin in the surface layer composition. The adhesiveness between the intermediate layer and the surface layer can be further improved thereby.

Further, the content of the energy ray curable resin in the surface layer composition is not specifically limited, but it is preferable that the number of (meth)acrylate functional groups is large from the point that the excellent adhesiveness with the intermediate layer can be reliably maintained.

The additional components which can be included in the surface layer composition in accordance with need are not specifically limited and may be appropriately selected depending on the purpose. Examples of the additional components include a polyol, a photopolymerization initiator, a photopolymerization promoter, a urethane bond forming catalyst, a fine particle, a surface modifier, a solvent, a (meth)acrylate, a foam stabilizer, an ion conductive agent, a filler, a peptizer, a foaming agent, a plasticizer, a softening agent, a tackifier, an antiblocking agent, a separation agent, a mold-releasing agent, a bulking agent, a colorant, a cross-linking agent, a vulcanizing agent, a polymerization inhibitor, and the like. These additional components may be used singly or in combination.

Additional Layers

The laminate of the present disclosure may comprise the base layer, the intermediate layer formed on the base layer, and the surface layer formed on the intermediate layer and additional layers in accordance with need.

The additional layers are not specifically limited, and may be appropriately selected in accordance with the purpose. Examples of the layers include adhesive layers between the base layer and a metal and the like. Examples of the metal include a metal shaft of a developing roller.

Method for Manufacturing the Laminate

The method for manufacturing the laminate of the present disclosure is not specifically limited, and can be manufactured by appropriately combining well-known methods in accordance with the manufacture of the laminate of the present disclosure.

Examples of the manufacturing method include a base layer formation process, an intermediate layer formation process performed after the base layer formation process, and a surface layer formation process performed after the intermediate layer formation process, and may include additional processes in accordance with need.

The base layer formation process forms a base layer by polymerizing the base layer composition containing the urethane resin.

The composition of the base layer is as described above.

Further, the specific method for forming the base layer is not specifically limited as long as the base layer composition can be formed by polymerizing and curing, and may be appropriately selected depending on the purpose. For example, the irradiation of energy rays such as UV rays, infrared rays, visible light, or electron beams and a heating process can be appropriately combined.

Furthermore, the base layer may be formed by coating the base layer composition on the surface of another member such as a shaft and then curing, and may be formed by filling the base layer composition in a mold and curing in the mold.

Note that, the method for coating the base layer composition is not specifically limited and may be appropriately selected depending on the purpose. Examples of the coating method include a casting method, an extrusion method, spraying, roll coater coating, dip coating, die coating, and the like. There may even be a polishing process in order to form a shape. Further, the coating method may even be a foam composition by a mechanical froth method, chemical foaming and the like. These methods may be used singly or in combination.

Further, the heating method for formation of the base layer is not specifically limited and may be appropriately selected depending on the purpose. Examples of the heating method include oven heating and the like. The conditions of the heating are not specifically limited, and the heating temperature, the heating time and the like can be appropriately selected in accordance with the components contained in the composition, the configuration of the composition, the coating amount of the composition and the like.

The intermediate layer formation process is a process for forming an intermediate layer by polymerizing and curing the non-UV curable resin in the coated intermediate layer composition after coating the intermediate layer composition containing the energy ray curable resin having the (meth)acryloyl group in a molecule, and, the non-UV curable resin having only the isocyanate group as the reactive functional group on the base layer formed by the aforementioned base layer formation process.

The composition of the intermediate layer is as described above.

The method for forming the intermediate layer is not specifically limited as long as it is a method which can cure the non-UV curable resin in the coated intermediate layer composition, and may be appropriately selected depending on the purpose. Examples of the curing method include curing by moisture curable by electron beam irradiation and the like. These methods may be used singly or in combination.

However, upon irradiating an energy ray such as UV rays or electron beams on the intermediate layer composition, the energy ray curable resin in the intermediate layer composition is cured, thus, it is necessary to use a method other than the aforementioned energy ray.

The surface layer formation process is a process which reacts the (meth)acryloyl group in the intermediate layer with the (meth)acryloyl group in the surface layer composition to form the surface layer bonded with the intermediate layer by polymerizing and curing the coated surface layer composition and the energy ray curable resin contained in the intermediate layer with an energy ray irradiation after the surface layer composition containing the energy ray curable resin having the (meth)acryloyl group in a molecule thereof was coated on the intermediate layer formed in the intermediate layer formation process.

Note that, the constitution of the surface layer is as described above.

Further, as stated above, the additional processes, other than the base layer formation process, the intermediate layer formation process and the surface layer formation process, are not specifically limited, and may be appropriately selected in accordance with the purpose, and examples of the additional processes include the respective cleaning processes for the base layer, the intermediate layer, and the surface layer.

Conductive Roller

The conductive roller of the present disclosure comprising the aforementioned laminate of the present disclosure.

By comprising the laminate of the present disclosure, the conductive roller having an excellent flexibility and adhesion durability can be realized.

The conductive roller is a conductive roller member, and specific examples thereof include a charging roller which uniformly charges an image carrier such as a photoreceptor, a developing roller for carrying and transporting a developer to be supplied to an image carrier, a developer supply roller which charges the developer being supplied to a developing roller, a fixing roller for fixing a developer image transferred to a recording medium such as recording paper, a cleaning roller for removing the developer, etc., adhered to an image carrier and the like.

Among these rollers, the developing roller is required to have, in particular, a large adhesiveness between layers and a large elasticity, thus, the developing member of the present disclosure is most preferably a developing roller.

Figure 2:
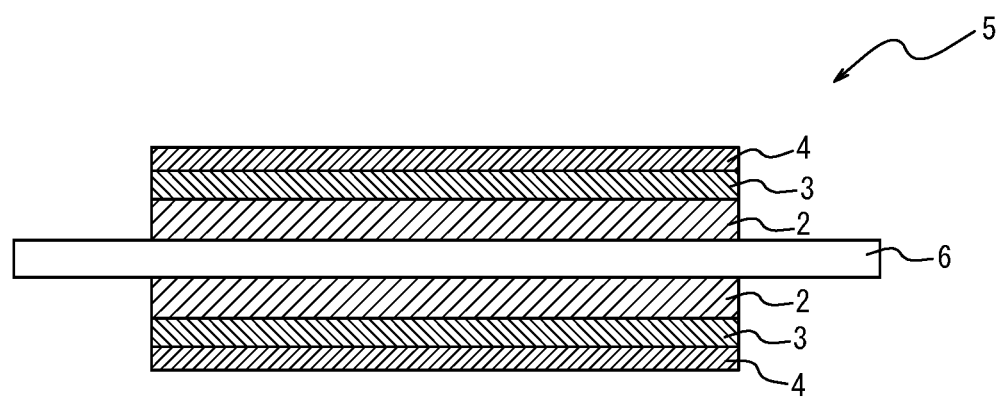
FIG. 2 is a partial cross-sectional diagram schematically illustrating one example of a developing roller which is an embodiment of the conductive roller.

FIG. 2 is a diagram schematically illustrating a cross-section of a developing roller as an example of the conductive roller of the present disclosure. The developing roller 5 illustrated in FIG. 2 comprises a shaft 6 mounted with its ends rotatably supported in a lengthwise direction, and a base layer 2 disposed radially outward of the shaft 6. Further, the developing roller 5 illustrated in FIG. 2 comprises an intermediate layer 3 adjacent to and radially outward of the base layer 2. Furthermore, the developing roller 5 illustrated in FIG. 2 comprises a surface layer 4 adjacent to and radially outward of the intermediate layer 3.

Note that, the shaft is not specifically limited and may be appropriately selected depending on the purpose as long as it has an adequate electric conductivity. An examples of the shaft includes a hollow or solid cylindrical body made of metal or resin.

EXAMPLES

Hereinafter, the present disclosure is further described in detail with reference to examples, however the present disclosure is not limited to the following examples.

Examples 1 to 10 and Comparative Examples 1 to 8

The laminate comprising the base layer, the intermediate layer and the surface layer was produced by the method described below.

(1) Formation of the Base Layer 6 parts by mass of Light Ester HO-A (2-hydroxyethyl acrylate, manufactured by Kyoeisha Chemical Co., Ltd.) as a (meth)acrylate, 22 parts by mass of SANNIX FA-951 (manufactured by Sanyo Chemical Industries, Ltd.) as a polyol, 55 parts by mass of Kuraray polyol F-510 (manufactured by Kuraray Co., Ltd.) as a polyol, 22 parts by mass of Kuraray polyol F-1010 (manufactured by Kuraray Co., Ltd.) as a polyol, 0.11 part by mass of Neostann U-100 (manufactured by Nitto Kasei Co. Ltd) as a urethane bond forming catalyst, and 0.04 part by mass of SF-2937F (manufactured by Dow Corning Toray Co., Ltd) as a foam stabilizer were blended to obtain the polyol mixture.

100 parts by mass of prepolymerized TDI (isocyanate group %=7%) prepared as stated above as the isocyanate was blended with 0.2 part by mass of Denka Black (manufactured by Denka Company Limited) as the carbon black to obtain the isocyanate mixture.

The polyol mixture was set in a mechanical froth foam-injection tank, and then, the isocyanate mixture was injected. Here, the base layer composition was prepared by injecting isocyanate mixture such that the isocyanate INDEX (NCO mole number/OH mole number) became 1.1.

Then, the prepared base layer composition was poured into a Φ16 mold, heated at 120° C. for 30 minutes using an oven, the cured base layer was taken out from the mold, and formed the base layer.

(2) Formation of the Intermediate Layer

For Examples 1 to 20, and, Comparative examples 1 to 4 and 6 to 8, a composition in which the predetermined amounts listed in Table 1 of the energy ray curable resin and the non-UV curable resin (described as the "moisture curable resin" in Table 1) listed in Table 1 were blended with 1 part by mass of IRGACURE907 (manufactured by BASF Japan Ltd.) per 100 parts by mass of the energy ray curable resin was prepared as the intermediate layer composition.

Then, the prepared intermediate layer composition was coated on the base layer to a thickness of 0.5 to 10 μm, left standing at a normal temperature for 2 hours, and the intermediate layer was formed by curing the coated films.

Note that, the intermediate layer was not formed for Comparative example 5.

(3) Formation of the Surface Layer

The composition in which the predetermined amounts listed in Table 1 of the energy ray curable resin listed in Table 1 were blended with 1 part by mass of IRGA-CURE907 (manufactured by BASF Japan Ltd.) was prepared as the surface layer composition.

The prepared surface layer composition was coated on the intermediate layer to a thickness of 0.5 to 10 μm. Then, UV was irradiated from the H valve of a UV lamp (manufactured by UV Systems, Inc.), and the coated film was cured to form the surface layer.

Evaluation

The following evaluations were performed for each sample of the laminate of the produced examples and the comparative examples. The evaluation results are listed in Table 1.

(1) Adhesiveness Testing

For each sample of the examples and the comparative examples, as illustrated in FIG. 3, the samples were reciprocated in a state in which a tip jig (tip angle: 70°, curvature radius: 0.5 mm) was pressed against the sample at a force of 1 N. Moreover, the one-way frequency of reciprocation was measured until peeling of the laminate occurred on each sample surface. Note that, the testing was performed twice: the case when the tip jig was pressed against the surface layer side of the laminate, and the case when the tip jig was pressed to the base layer side of the back surface. The adhesiveness of the base layer and the intermediate layer and the adhesiveness of the surface layer and the intermediate layer were respectively evaluated.

The evaluation of the adhesiveness was performed in accordance with the following criteria.
A: Peeling did not occur even when the one-way frequency of reciprocation exceeded 100 times.
B: Peeling did not occur until the one-way frequency of reciprocation was 30 times, but peeling occurred if in excess of 100 times.
C: Peeling did not occur until the one-way frequency of reciprocation was 10 times, but peeling occurred if in excess of 30 times.
D: Peeling occurred when the one-way frequency of reciprocation was 10 times.

TABLE 1

| | | Examples | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| Base layer composition | (content of urethane resin)*8 | 100 | 100 | 100 | 100 | 100 | 100 | 100 | 100 | 100 | 100 |
| Intermediate layer composition (ratio to 100 parts by mass of moisture-curing | Moisture-curing A *1 | 100 | 100 | 100 | 100 | 100 | 100 | — | — | 100 | 100 |
| | Moisture-curing B *2 | — | — | — | — | — | — | 100 | — | — | — |
| | Moisture-curing C *3 | — | — | — | — | — | — | — | 100 | — | — |
| | UV curable resin A *4 | 10 | — | — | 5 | 100 | 10 | 10 | 10 | 1 | 200 |
| | UV curable resin B *5 | — | 10 | — | — | — | — | — | — | — | — |

TABLE 1-continued

| | | | Examples | | | | | | | | | |
|---|---|---|---|---|---|---|---|---|---|---|---|---|
| resin) | UV curable resin C *6 | | — | — | 10 | — | — | — | — | — | — | — |
| | Photoinitiator *7 | | 0.1 | 0.1 | 0.1 | 0.1 | 0.1 | 0.1 | 0.1 | 0.1 | 0.1 | 0.1 |
| Surface layer composition (ratio to 100 parts by mass of UV curable resin) | UV curable resin A *4 | | 100 | 100 | 100 | 100 | 100 | — | 100 | 100 | 100 | 100 |
| | UV curable resin B *5 | | — | — | — | — | — | 100 | — | — | — | — |
| | Photoinitiator *7 | | 1 | 1 | 1 | 1 | 1 | 1 | 1 | 1 | 1 | 1 |
| Evaluation | Adhesiveness testing | Base layer/Intermediate layer | A | A | A | A | B | A | B | A | A | C |
| | | Intermediate layer/Surface layer | A | A | A | B | A | A | A | A | C | A |

| | | | Comparative Examples | | | | | | | |
|---|---|---|---|---|---|---|---|---|---|---|
| | | | 1 | 2 | 3 | 4 | 5 | 6 | 7 | 8 |
| | Base layer composition (content of urethane resin)*8 | | 100 | 100 | 100 | 100 | 100 | 100 | 100 | 100 |
| | Intermediate layer composition (ratio to 100 parts by mass of moisture-curing resin) | Moisture-curing A *1 | 100 | 100 | — | — | — | — | — | — |
| | | Moisture-curing B *2 | — | — | — | — | — | — | — | — |
| | | Moisture-curing C *3 | — | — | 100 | — | — | — | — | — |
| | | UV curable resin A *4 | — | — | — | 100 | — | 100 | — | — |
| | | UV curable resin B *5 | — | — | — | — | 100 | — | 100 | — |
| | | UV curable resin C *6 | — | — | — | — | — | — | — | 100 |
| | | Photoinitiator *7 | — | — | — | — | — | 0.1 | 0.1 | 0.1 |
| | Surface layer composition (ratio to 100 parts by mass of UV curable resin) | UV curable resin A *4 | 100 | — | 100 | 100 | 100 | 100 | 100 | 100 |
| | | UV curable resin B *5 | — | 100 | — | — | — | — | — | — |
| | | Photoinitiator *7 | 1 | 1 | 1 | 1 | 1 | 1 | 1 | 1 |
| | Evaluation | Adhesiveness testing | | | | | | | | |
| | | Base layer/Intermediate layer | A | A | A | A | D | D | D | D |
| | | Intermediate layer/Surface layer | D | D | D | D | D | A | A | A |

*1: Moisture curable resin having a dephenylmethane diisocyanate skeleton ("PD-200" manufactured by Asia Industry Co., Ltd.)
*2: Moisture curable resin having an isophorone diisocyanate skeleton ("OCM-50" manufactured by Asia Industry Co., Ltd.)
*3: Moisture curable resin having a dephenylmethane diisocyanate skeleton ("Desmodur RE" manufactured by Covestro Japan Ltd.)
*4: Urethane acrylate resin ("PX31-96" manufactured by Asia Industry Co., Ltd.)
*5: Urethane acrylate resin ("PX31-76" manufactured by Asia Industry Co., Ltd.)
*6: Urethane acrylate resin ("PX31-76" manufactured by Asia Industry Co., Ltd.)
*7: "IRGACURE907" manufactured by BASF Japan, Ltd
*8Base layer composition described in "(1) Formation of the base layer"

From the results in Table 1, it is understood that the laminate of each example shows an excellent adhesiveness compared to the laminate of the comparative examples.

INDUSTRIAL APPLICABILITY

The present disclosure provides a laminate having an excellent adhesiveness between the base layer and the surface layer while having a good flexibility. Further, the present disclosure provides a conductive roller having an excellent flexibility and adhesion durability.

REFERENCE SIGNS LIST 1 laminate
2 base layer
3 intermediate layer
4 surface layer
5 developing roller (conductive roller)
6 shaft

The invention claimed is:

1. A laminate comprises at least a base layer, an intermediate layer formed on the base layer, and a surface layer formed on the intermediate layer, wherein
the base layer is a polymer of a base layer composition containing an urethane resin having a hydroxyl group,
the intermediate layer is a polymer of an intermediate layer composition containing an energy ray curable resin having (meth)acryloyl group in a molecule thereof, and, a non-UV curable resin having only isocyanate group as reactive functional group, and
the surface layer is a polymer of a surface layer composition containing resin component consisting of a UV curable resin having the (meth)acryloyl group in a molecule thereof, and
wherein recesses and protrusions are formed by the isocyanate compound of the non-UV curable resin on the inside of the intermediate layer, and, anchor effect is exerted between the energy ray curable resin of the intermediate layer and the isocyanate compound of the non-UV curable resin.

2. The laminate according to claim 1, wherein the non-UV curable resin in the intermediate layer composition is a moisture curable resin.

3. The laminate according to claim 2, wherein the moisture curable resin has aromatics in the molecule.

4. The laminate according to claim 1, wherein the content of the energy ray curable resin in the intermediate layer composition is 1 to 200 parts by mass per 100 parts by mass of the non-UV curable resin.

5. The laminate according to claim 1, wherein the energy ray curable resin in the intermediate layer composition is the same as the UV curable resin in the surface layer composition, or, has a part of that is the same as the UV curable resin in the surface layer composition.

6. The laminate according to claim 1, wherein the energy ray curable resin in the intermediate layer composition has a urethane skeleton in the molecule, and the UV curable resin having (meth)acryloyl group in the surface layer composition is a urethane (meth)acrylate.

7. A conductive roller comprising the laminate according to claim 1.

8. The laminate according to claim 2, wherein the content of the energy ray curable resin in the intermediate layer composition is 1 to 200 parts by mass per 100 parts by mass of the non-UV curable resin.

9. The laminate according to claim 2, wherein the energy ray curable resin in the intermediate layer composition is the same as the UV curable resin in the surface layer composition, or, has a part of that is the same as the UV curable resin in the surface layer composition.

10. The laminate according to claim 2, wherein the energy ray curable resin in the intermediate layer composition has a urethane skeleton in the molecule, and the UV curable resin having (meth)acryloyl group in the surface layer composition is a urethane (meth)acrylate.

11. A conductive roller comprising the laminate according to claim 2.

12. The laminate according to claim 3, wherein the content of the energy ray curable resin in the intermediate layer composition is 1 to 200 parts by mass per 100 parts by mass of the non-UV curable resin.

13. The laminate according to claim 3, wherein the energy ray curable resin in the intermediate layer composition is the same as the UV curable resin in the surface layer composition, or, has a part of that is the same as the UV curable resin in the surface layer composition.

14. The laminate according to claim 3, wherein the energy ray curable resin in the intermediate layer composition has a urethane skeleton in the molecule, and the UV curable resin having (meth)acryloyl group in the surface layer composition is a urethane (meth)acrylate.

15. A conductive roller comprising the laminate according to claim 3.

16. The laminate according to claim 4, wherein the energy ray curable resin in the intermediate layer composition has a urethane skeleton in the molecule, and the UV curable resin having (meth)acryloyl group in the surface layer composition is a urethane (meth)acrylate.

17. A conductive roller comprising the laminate according to claim 4.

18. The laminate according to claim 5, wherein the energy ray curable resin in the intermediate layer composition has a urethane skeleton in the molecule, and the UV curable resin having (meth)acryloyl group in the surface layer composition is a urethane (meth)acrylate.

19. A conductive roller comprising the laminate according to claim 5.

20. A conductive roller comprising the laminate according to claim 6.

* * * * *